Figure 1:
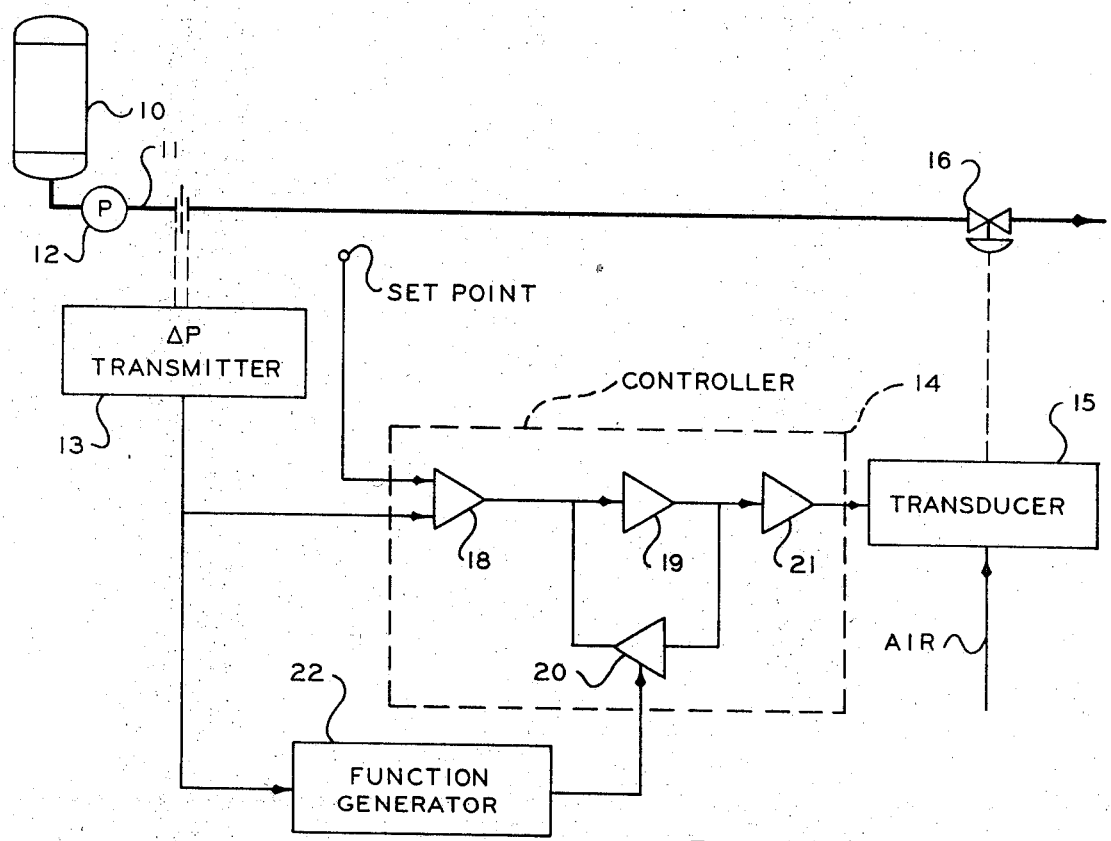

United States Patent

[11] 3,552,428

[72] Inventor Troy J. Pemberton
 Bartlesville, Okla.
[21] Appl. No. 738,470
[22] Filed June 20, 1968
[45] Patented Jan. 5, 1971
[73] Assignee Phillips Petroleum Company
 a corporation of Delaware

[54] AUTOMATICALLY TUNED PROCESS CONTROLLER
 7 Claims, 4 Drawing Figs.
[52] U.S. Cl. .................................................. 137/486,
 137/487.5, 235/151.34, 307/229, 330/86
[51] Int. Cl. .................................................. G05d 7/06
[50] Field of Search ........................................ 137/486,
 487.5, 85, 86, MA; 235/151.34; 307/229; 330/86

[56] References Cited
UNITED STATES PATENTS
| | | | |
|---|---|---|---|
| 2,834,363 | 5/1958 | Pessen.......................... | 137/86X |
| 2,862,162 | 11/1958 | Baring.......................... | 137/487.5X |
| 2,985,183 | 5/1961 | Peatross....................... | 137/86 |
| 3,238,962 | 5/1966 | Read............................. | 137/86 |

Primary Examiner—M. Cary Nelson
Assistant Examiner—Robert J. Miller
Attorney—Young and Quigg ABSTRACT: A process control system is compensated for nonlinearities in the control loop by means of a variable gain feedback element in the controller. The gain of the feedback element is adjusted by the output signal from a function generator, the input of which is the measured variable. The function generator is calibrated to compensate for the nonlinearity of the control loop.

INVENTOR.
T. J. PEMBERTON

INVENTOR.
T.J. PEMBERTON

BY Young + Quigg

ATTORNEYS

AUTOMATICALLY TUNED PROCESS CONTROLLER

It is common practice in industrial operations to control various processes automatically. For example, the automatic control of the rate of fluid flow through conduits is employed extensively. The actual fluid flow is measured by a suitable detector, which commonly is in the form of a transducer which establishes a signal representative of the differential pressure across an orifice. This signal is then compared with a set point signal which represents the desired rate of flow, and any difference therebetween is employed to control a valve to regulate the actual flow. In other operations, fluid flows can be regulated in response to measurements of liquid levels, pressures or other process variables.

Many automatic control loops of the type described are sensitive to changes in operating conditions because of nonlinearities within the control loop. This can be caused by nonlinearities in the sensing element or in the control valve device. Unfortunately, many of these elements are not linear over their entire operating range. This is particularly true with differential pressure transmitters which are commonly employed in flow control operations. If operating conditions change materially, such as during startup operations, the control loop must be retuned if satisfactory control is to be maintained. In conventional controllers, this retuning can involve an adjustment of one or more of the controller mode gains or time constants (proportional, reset or rate). The nature and location of the nonlinearities within the control loop determine the extent to which each of the mode gains must be changed in order to compensate for a particular change in operating conditions. For those loops with nonlinearities that affect only the steady state gain, retuning of the proportional gain is usually all that is required.

In accordance with the present invention, a system is provided for adjusting automatically the gain of a control system as the measured variable changes. This is accomplished by adjusting the gain of a feedback loop in the controller in response to changes in the measured variable. This is accomplished by the use of a function generator which provides a nonlinear output signal as a function of the measured variable.

Accordingly, it is an object of this invention to provide an improved process controller wherein the gain of a feedback loop in the controller is adjusted automatically in response to changes of the measured variable.

Another object is to provide improved apparatus for maintaining constant flow rates through a conduit.

Figure 2:
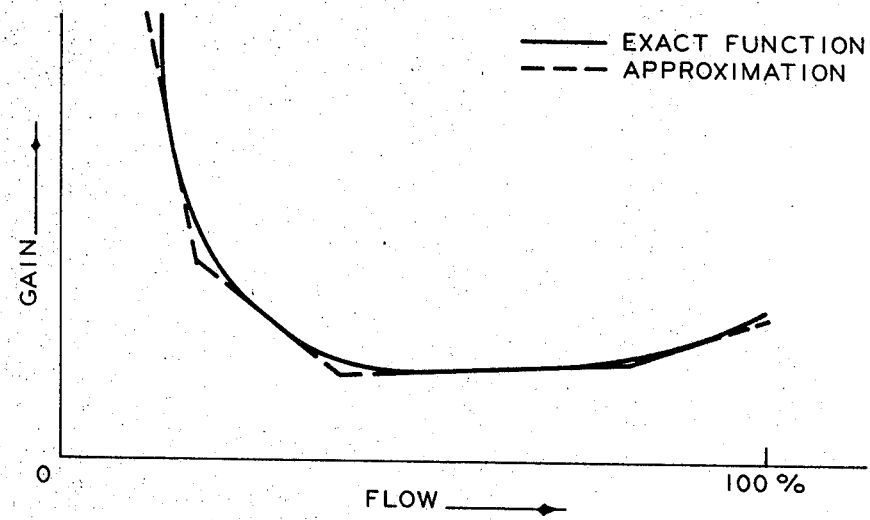
Figure 3:
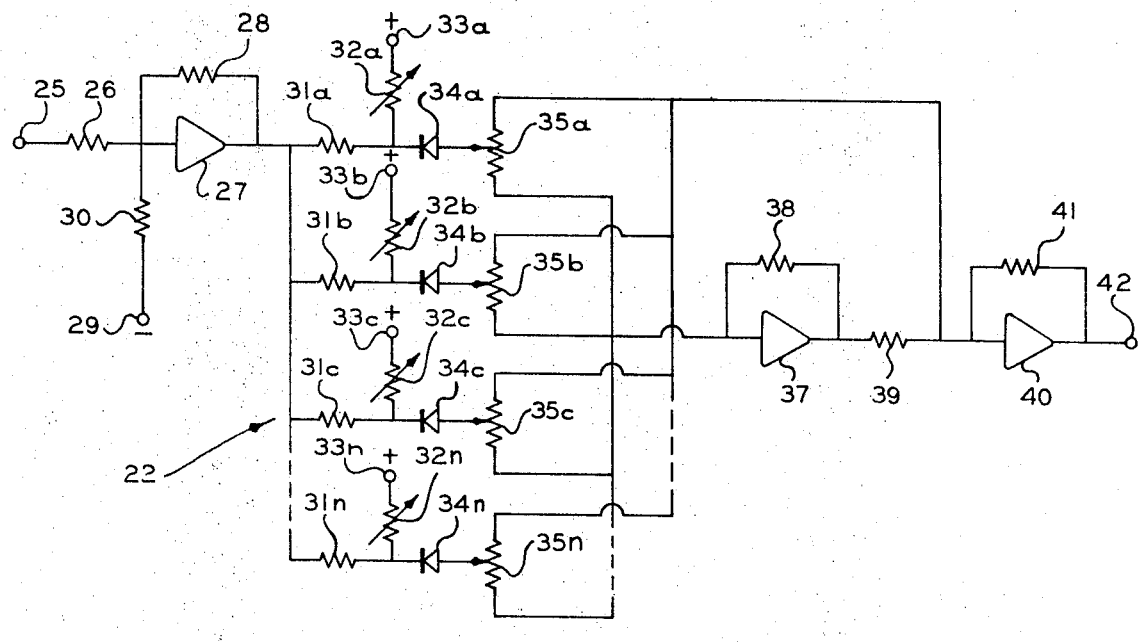
Figure 4:
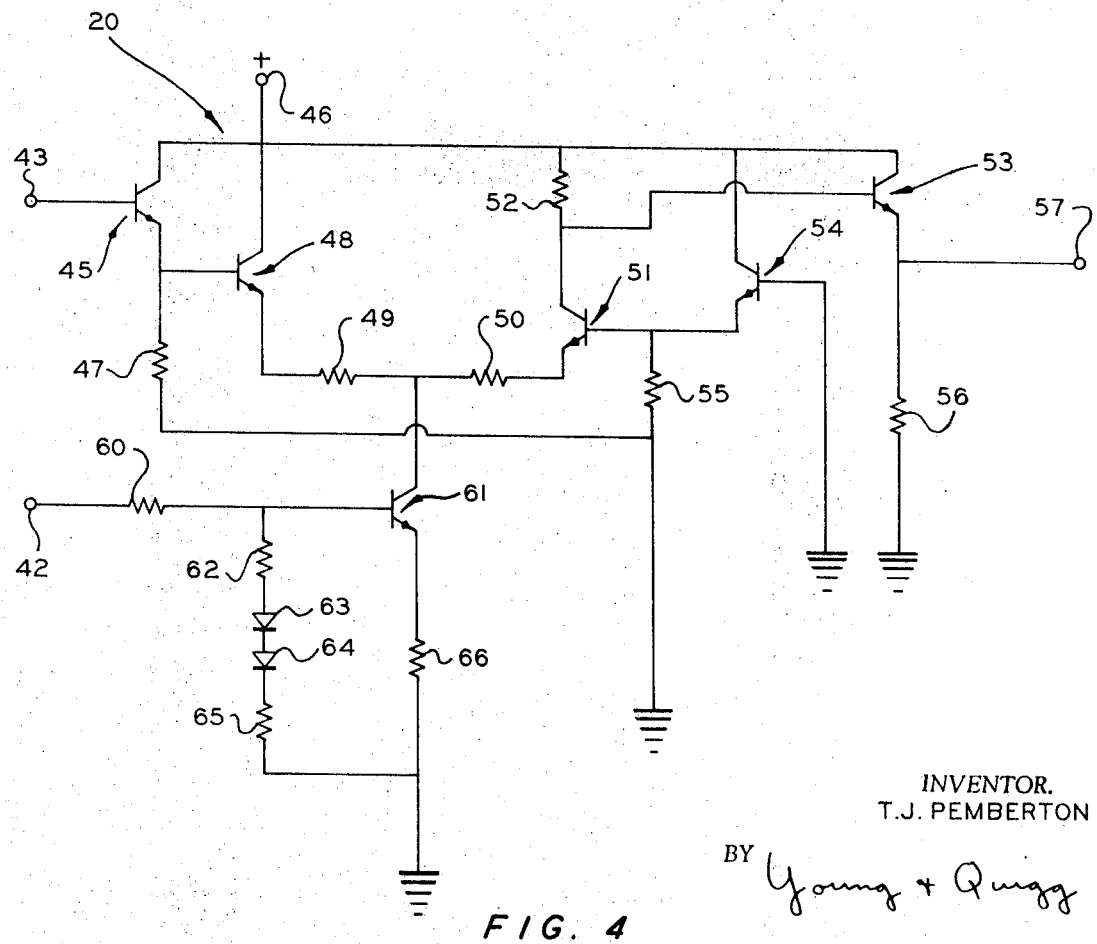

Other objects, advantages and features of the invention should become apparent from the following detailed description, taken in conjunction with the accompanying drawing in which:

FIG. 1 is a schematic illustration of an automatic flow control system which incorporates the tuned controller of this invention. FIG. 2 is a graphical representation of certain operating features of the control system of FIG. 1. FIG. 3 is a schematic circuit drawing of a function generator which can be employed in the control system of FIG. 1. FIG. 4 is a schematic circuit drawing of a variable gain amplifier which can be employed in the control system of FIG. 1.

Referring now to the drawing in detail and to FIG. 1 in particular, there is shown a schematic representation of a typical liquid flow system. Liquid from a storage vessel 10 is passed through a conduit 11 to a point of utilization, now shown. Conduit 11 is provided with a pump 12 to direct liquid through the conduit. An automatic controller is provided to maintain the rate of flow through conduit 11 constant at a predetermined value. To this end, the rate to flow through conduit 11 is measured by a flow transducer, which can be a differential pressure transmitter 13. This transmitter is connected across an orifice in conduit 11 to measure the pressure drop across the orifice. As is well known, this differential pressure is a function of the flow rate through the conduit. Transmitter 13 provides an output signal which is representative of the differential pressure. This output signal, which is electrical in the embodiment illustrated, is proportional to the measured differential pressure. The output signal from transmitter 13 is applied to the input of a controller 14. The second input to controller 14 is a set point signal which is representative of a desired rate of flow through conduit 11. Controller 14 compares the set point signal with the signal from transmitter 13 and provides an output signal which is representative of any difference therebetween. This output signal is applied to a transducer 15 which converts the electrical signal into a pneumatic pressure signal, the amplitude of which is proportional to the electrical signal. The output signal from transducer 15 is applied to control the opening of a valve 16 in conduit 11. Transducer 15 is not needed if valve 16 is electrically operated.

The apparatus thus far described comprises a conventional automatic flow control system, many embodiments of which are available commercially. Unfortunately, systems of this type are not linear over wide ranges of flow, thus presenting a problem when the flow must be adjusted from time to time over a substantial range. In FIG. 2, operating characteristics of a typical flow control system of the type described are illustrated schematically. The solid curve of FIG. 2 is representative of the gain required to keep the controller uniformly tuned at various flow rates of a conventional flow control system to substantial variations in flow. In accordance with the present invention, apparatus is provided for adjusting the gain of controller 14 as a function of this curve so as to compensate for the nonlinearity of the system.

As illustrated in FIG. 1, controller 14 comprises an input comparing means, which can be in the form of a summing amplifier 18. Amplifier 18 compares the set point signal and the signal from transmitter 13 and establishes an output signal which is representative of any differences therebetween. The output signal from device 18 is applied to a proportional gain amplifier 19 which is provided with a feedback network having a variable gain amplifier 20 therein. The output signal from amplifier 19 is applied through a power amplifier 21 to transducer 15. The illustrated controller contains only the single mode, proportional band. However, it is within the scope of this invention to employ controllers which also include integral and/or derivative modes. An output signal from transmitter 13 is applied to the input of a function generator 22. The output signal from generator 22, which is employed to adjust the gain of feedback amplifier 20, is designed to provide an output signal which closely approximates the solid curve illustrated in FIG. 2. In this manner, the gain of the controller is varied as a function of the measured flow rate so that the actual flow control is linear over the entire flow range.

A function generator which is capable of establishing an output signal that closely approximates the solid curve of FIG. 2 is illustrated schematically in FIG. 3. This generator does not reproduce the solid curve of FIG. 2 exactly, but rather provides an output which corresponds to the broken line curve of FIG. 2. The output signal from transmitter 13 is applied to input terminal 25 of FIG. 3. This terminal is connected by a resistor 26 to the input of a high gain amplifier 27 which is provided with a feedback resistor 28. A negative reference potential is applied to a terminal 29 which is connected by a resistor 30 to the input of amplifier 27. The output of amplifier 27 is connected by resistors 31a and 32a to a terminal 33a which is maintained at a positive reference potential. A diode 34a is connected between the contactor of a potentiometer 35a and the junction between resistors 31a and 32a. One end terminal of potentiometer 35a is connected to the input of a high gain amplifier 37 which is provided with a feedback resistor 38. The output of amplifier 37 is connected through a resistor 39 to the input of a high gain amplifier 40, the latter having a feedback resistor 41. The second end terminal of potentiometer 35a is connected to the input of amplifier 40. The output of amplifier 40 is applied to a terminal 42 which is connected to amplifier 20 of FIG. 1.

A series of corresponding resistors, diodes and potentiometers are connected between amplifiers 27 and 37, as illustrated. These elements are designated by corresponding reference numerals, such as resistors 31b, 31c—31n. The number of these additional circuits is determined by the number of broken line segments which are desired or needed to approximate the solid curve of FIG. 2. Each network provides one segment. Obviously, the more segments employed, the better is the approximation to the exact function. The ratio of the value of resistor 31a to the value of resistor 32a determines the break point of the first segment of the broken line curve of FIG. 2. The setting of the potentiometer 35a determines the slope of this segment. In similar fashion, corresponding values of resistors and potentiometers of the other networks determine the configurations of the remaining individual segments.

The curve of FIG. 2 can be approximated from theoretical considerations or can be derived by passing liquid through conduit 31 at a series of known flow rates and measuring the actual response of the control system, without the use of function generator 22. Once the shape of the curve of FIG. 2 is known or approximated, the variable resistors and potentiometers in the function generator can be set by trial and error procedure to match or approximate the curve of FIG. 2 thereby to provide the necessary linearity.

The output signal from function generator 22 is employed to control the gain of feedback amplifier 20, and thus regulate the gain of controller 14. A suitable amplifier 20 which can be employed for this purpose is illustrated schematically in FIG. 4. Input terminal 43 is connected to the base of a first transistor 45. The collector of transistor 45 is connected to a positive potential terminal 46, and the emitter is connected through a resistor 47 to ground. The emitter of transistor 45 is also connected to the base of a second transistor 48. The collector of transistor 48 is connected to terminal 46, and the emitter is connected through resistors 49 and 50 to the emitter of a transistor 51. The collector of transistor 51 is connected by a resistor 52 to terminal 46. This collector is also connected directly to the base of a transistor 53. The base of transistor 51 is connected directly to the emitter of a transistor 54 and to ground through a resistor 55. The collector of transistor 53 is connected to terminal 46. The emitter of this transistor is connected to ground through a resistor 56. The emitter of transistor 53 is also connected to an output terminal 57.

The gain of the amplifier thus far described is adjusted by the output signal from function generator 22, which is applied to terminal 42. This terminal is connected by a resistor 60 to the base of a transistor 61. The base of transistor 61 is connected to ground through a resistor 62, diodes 63 and 64 and a resistor 65. The emitter of transistor 61 is connected to ground through a resistor 66. The collector of transistor 61 is connected to the junction between resistors 49 and 50 so as to vary the gain of the amplifier in accordance with the amplitude of the signal applied to terminal 42. In this manner, the gain of amplifier 20, and thus the gain of controller 14, is regulated in response to the output of function generator 22.

While this invention has been described in conjunction with a specific controller for use in a flow control system, the invention can be employed in other types of control systems, such as liquid level controllers, for example. The invention is useful whenever the control loop is nonlinear, but has a response which is a definite function of the measured variable or of another signal representative thereof. This permits the function generator to be adjusted to compensate for the nonlinearity of the control system. The principles of this invention are also applicable to partial or total digital control and supervisory systems.

While the invention has been described in conjunction with presently preferred embodiments, it is evident that it is not limited thereto.

I claim:

1. In a process control system which includes means to sense a process variable and establish a first signal representative thereof, means to compare said first signal with a set point signal and establish a second signal representative of the difference therebetween, and means responsive to said second signal to establish an output control signal; the improvement comprising: feedback means connected between the output and the input of said means to establish an output signal, said feedback means having a variable gain means included therein; a function generator having an input and an output, to establish an output signal which varies in a predetermined nonlinear manner with respect to changes in amplitude of an input signal applied thereto; means independent of said set point signal to apply said first signal to the input of said function generator as the sole input signal thereto; and means to apply the output signal from said function generator to said variable gain means to regulate the gain of said feedback means.

2. The system of claim 1 wherein said process variable is the rate of fluid flow through a conduit; and further comprising a valve in said conduit, and means responsive to said output signal to regulate said valve.

3. The system of claim 2 wherein said means to sense said process variable is an orifice in said conduit and means to establish a first signal which is representative of the pressure differential across said orifice.

4. The system of Claim 1 wherein said first signal is an electrical signal, said means to establish an output signal comprises a first amplifier having an input and an output, and said feedback means comprises a variable gain amplifier having an input and an output, the input of said variable gain amplifier being connected to the output of said first amplifier and the output of said variable gain amplifier being connected to the input of said first amplifier.

5. In a process control system which includes means to sense a process variable and establish a first electrical signal representative thereof, means to compare said first signal with a set point signal and establish a second signal representative of the difference therebetween, and a first amplifier responsive to said second signal to establish an output control signal, said first amplifier having an input and an output; the improvement comprising: a variable gain feedback amplifier having an input and an output, the input of said variable gain amplifier being connected to the output of said first amplifier and the output of said variable gain amplifier being connected to the input of said first amplifier; a function generator to establish an output signal which varies in a predetermined manner with respect to changes in an input signal applied thereto, said function generator comprising circuit means having a plurality of diodes connected in parallel between the input and output thereof, and means biasing each of said diodes so that conduction takes place therethrough at a predetermined voltage; means to apply said first signal to the input of said function generator; and means to apply the output signal from said function generator to said variable gain amplifier to regulate the gain thereof.

6. The system of claim 5 wherein said process variable is the rate of fluid flow through a conduit; and further comprising a valve in said conduit, and means responsive to said output signal to regulate said valve.

7. The system of claim 6 wherein said means to sense said process variable is an orifice in said conduit and means to establish a first signal which is representative of the pressure differential across said orifice.